United States Patent
Roeder et al.

(10) Patent No.: US 10,620,853 B2
(45) Date of Patent: Apr. 14, 2020

(54) METHOD AND APPARATUS FOR CONTROLLING A MEMORY SYSTEM TO PERFORM A SAFE SHUTDOWN OF A VOLATILE MEMORY OF A HOST

(71) Applicant: HYPERSTONE GMBH, Constance (DE)

(72) Inventors: Martin Roeder, Constance (DE); Christoph Baumhof, Radolfzell (DE)

(73) Assignee: HYPERSTONE GMBH, Constance (DE)

( * ) Notice: Subject to any disclaimer, the term of this patent is extended or adjusted under 35 U.S.C. 154(b) by 124 days.

(21) Appl. No.: 15/853,446

(22) Filed: Dec. 22, 2017

(65) Prior Publication Data

US 2019/0114093 A1    Apr. 18, 2019

(30) Foreign Application Priority Data

Oct. 17, 2017  (DE) .......................... 10 2017 124 188

(51) Int. Cl.
| | |
|---|---|
| G06F 3/06 | (2006.01) |
| G06F 1/26 | (2006.01) |
| G06F 1/30 | (2006.01) |
| G06F 12/02 | (2006.01) |
| G06F 13/16 | (2006.01) |

(52) U.S. Cl.
CPC ............ *G06F 3/0619* (2013.01); *G06F 1/263* (2013.01); *G06F 1/30* (2013.01); *G06F 3/0631* (2013.01); *G06F 3/0634* (2013.01); *G06F 3/0656* (2013.01); *G06F 3/0685* (2013.01); *G06F 12/0253* (2013.01); *G06F 13/1673* (2013.01); *G06F 2212/7205* (2013.01)

(58) Field of Classification Search
CPC .......... G06F 3/0619; G06F 1/30; G06F 1/263; G06F 3/0634; G06F 3/0631; G06F 3/0685
See application file for complete search history.

(56) References Cited

U.S. PATENT DOCUMENTS

| | | | |
|---|---|---|---|
| 2013/0145085 A1* | 6/2013 | Yu ....................... | G06F 12/0246 711/103 |
| 2016/0124673 A1 | 5/2016 | Feng et al. | |
| 2017/0125070 A1 | 5/2017 | Hadar et al. | |
| 2017/0168890 A1* | 6/2017 | Marripudi ................. | G06F 1/28 |

OTHER PUBLICATIONS

German Search Report dated Jul. 24, 2018.

* cited by examiner

*Primary Examiner* — Shelly A Chase
(74) *Attorney, Agent, or Firm* — HDC IP Law, LLP

(57) ABSTRACT

Various embodiments are related to non-volatile memories, systems, and methods of using such. Some such embodiments include a memory controller that is configured to reserve a predetermined amount of unused dedicated memory in the NVM and control the memory system to operate in a normal mode of operation in which it is configured to provide at least write access to the NVM, enable a garbage collection process for the NVM, and maintain in the NVM at least said amount of dedicated unused memory. Reserving the predetermined amount of unused dedicated memory in the NVM and controlling the memory system to operate in the normal mode of operation includes reserving at least one specific unused dedicated memory portion in the NVM and controlling the memory system such that during the normal mode of operation the host's write access to the dedicated memory portion is disabled.

26 Claims, 2 Drawing Sheets

METHOD AND APPARATUS FOR CONTROLLING A MEMORY SYSTEM TO PERFORM A SAFE SHUTDOWN OF A VOLATILE MEMORY OF A HOST

CROSS REFERENCE TO RELATED APPLICATIONS

The present application claims priority to German Patent Application No. 10 2017 124 188.4 entitled "Method and Apparatus for Controlling a Memory System to Perform a Safe Shutdown of a Volatile Memory of a Host", and filed Oct. 17, 2017. The entirety of the aforementioned reference is incorporated herein by reference for all purposes.

FIELD OF THE INVENTION

Embodiments are generally related to the field of memory systems comprising both volatile memory (VM), such as random-access memory (RAM), and non-volatile memory (NVM), such as flash memory. More specifically, various embodiments are directed to such a memory system and to a method and a memory controller for controlling same.

BACKGROUND

Nowadays, non-volatile digital information memory and particularly flash memory is found in many electronic devices, for example in communication technology and automotive technology. Non-volatile information memory is characterized by the fact that unlike volatile information memory, such as random access memory (RAM), it does not lose the data stored therein, if its power supply is discontinued. However, generally NVMs show some peculiarities that must be considered for their controlling by means of a NVM controller. For example, during a system shut down, whether voluntary or involuntary, to assure preservation of data it must be transferred from RAM to an NVM. This process can be problematic where power is not maintained sufficiently long to assure completion of the transfer.

Hence, for at least this reason, exist a need in the art for enhanced methods and memory systems for shutting down volatile memory without incurring data loss.

SUMMARY

Embodiments are generally related to the field of memory systems comprising both volatile memory (VM), such as random-access memory (RAM), and non-volatile memory (NVM), such as flash memory. More specifically, various embodiments are directed to such a memory system and to a method and a memory controller for controlling same.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Figure 1:
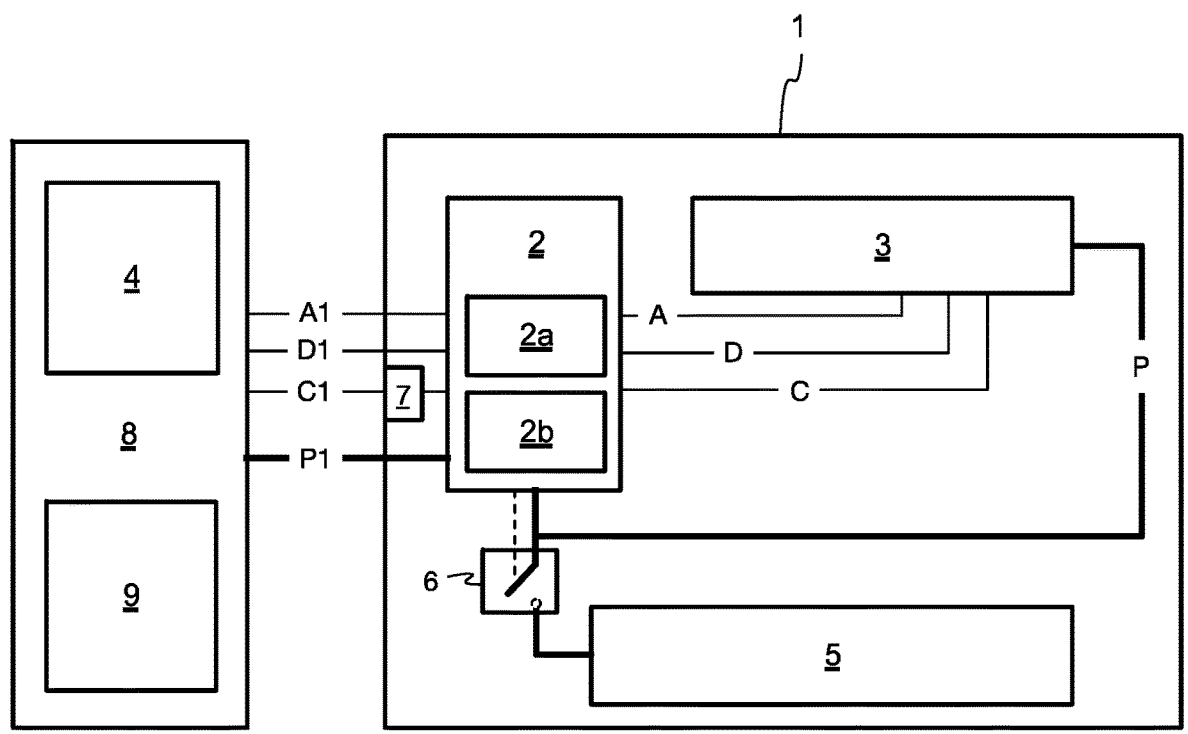
FIG. 1 schematically illustrates a host including a related VM and an example memory system, according to some embodiments of the present inventions.

Embodiments are generally related to the field of memory systems comprising both volatile memory (VM), such as random-access memory (RAM), and non-volatile memory (NVM), such as flash memory. More specifically, various embodiments are directed to such a memory system and to a method and a memory controller for controlling same.

The main memory of most computer-based systems, such as without limitation desktop or portable computers, servers, communication terminals, computer-based infrastructure, electronic control units or modules (ECU, ECM), such as for automotive applications etc., typically includes volatile memory because of its superior performance compared to non-volatile memory. As used herein, "volatile memory" or "VM" is used in its broadest sense to mean a memory that needs to be continuously powered in order to be able to keep and retrieve the stored information (e.g., dynamic RAM (DRAM) or static RAM (SRAM)). As used herein, "non-volatile memory" is used in its broadest sense to mean a memory that can keep and retrieve stored information even after having been power cycled (turned off and back on).

Many applications require a preservation of information being stored in a main memory implemented primarily with volatile memory even beyond a power-down event, i.e. an event where the power supply of the main memory or at least the volatile memory therein is discontinued or becomes insufficient to fully support normal operation of the main memory. A known way of meeting this requirement is transferring the information to be preserved from the volatile memory into a non-volatile memory before the power-down event actually occurs, i.e. affects the power supply of the volatile memory. When thereafter the power supply is restored, the information can be transferred back into the volatile memory where it is then available again to the application. A common type of non-volatile memory is flash memory, which is used n many computer systems as a mass storage device (e.g., SSD, USB drive, . . . ).

A known solution for ensuring safe operation of the VM of a computer system that also has access to an NVM, is to use a large capacitor to continuously supply power to at least the VM and the NVM devices for a small amount of time after the main power supply is removed such that the relevant information in the volatile main memory can be written into the non-volatile memory before the power supply provided by the capacitor is exhausted.

However, a reliable implementation of the aforementioned capacitor based approach requires that (i) the amount of information that is to be transferred from the VM into the NVM at the occurrence of a power-down event is limited, and (ii) the amount of remaining energy the capacitor can provide after detection of the power-down event is sufficient to enable the transfer of said amount of information from the VM to the NVM. The first condition (i) can be ensured by the designing the application (computer program) appropriately. In order to meet the second condition (ii), the non-volatile memory device(s) used to implement the NVM must have a certain reliable maximum power consumption per unit of information to be written. This usually translates into a certain minimum write throughput that needs to be ensured by the non-volatile memory device after the power-down event has been detected, such that the transfer can be completed successfully before the amount of energy stored in the capacitor for supply to the NVM is exhausted and thus the related remaining operational time of the NVM based on this amount of energy is expired.

Specifically, flash-based non-volatile memory devices usually exhibit a rather variable write performance that depends on the state of the device (preconditioning) and on the nature of the command workload (e.g. random vs. sequential access) that is applied by the host, e.g. the processing unit of the computer system. Prolonged random write usually leads to the lowest write performance, which can be orders of magnitudes below the highest performance that is usually reached using sequential write workloads on a new device. In practice, it can therefore be hard to ensure a certain minimum write throughput in the power-down situation outlined above, especially if the required write throughput is close to the highest write performance that the device can achieve in any case.

The physical memory storage capacity of several types of NVM, including particularly flash memory-based storage devices, is larger than the logical storage capacity that is made available to the host. This is because such a NVM device needs to store additional management data in the NVM, and at least in the case of flash based-memory due to an access limitation of flash memory that requires erasing blocks of the flash memory before new data can be written into them. This access limitation is usually handled by maintaining a pool of unused memory blocks that can be allocated for writing new data. Blocks of this pool are consumed, when the host writes data to the memory device.

Accordingly, there needs to be another mechanism that feeds this pool with new unused blocks, or more generally, with new unused memory capacity. This mechanism is usually called "garbage collection", and typically runs in parallel with host command processing (especially during continuous write command workload) to ensure a sufficient fill level of the block pool at all times. The garbage collection involves internal data transfer within the NVM device itself. This transfer utilizes some part of the available memory bandwidth which is consequently not available to host command processing, e.g. of a write command. This is at least in part the reason for the variable performance, particularly write performance, of certain NVM devices, including in particular flash memory-based storage devices.

As just one example of the value of systems, devices and methods discussed herein, some embodiments of the present inventions are designed to enable a safe shutdown of a volatile memory, VM, of a host in the case of a power-down event.

Various embodiments of the present inventions provide methods for controlling a memory system including a memory controller and non-volatile memory, NVM, for example a flash-based NVM, to enable a safe shutdown of a volatile memory, VM, of a host. Such methods may include, for example: (i) reserving a pre-determined amount of unused dedicated memory in the NVM and controlling the memory system to operate in a normal mode of operation in which it is configured to provide at least write access to the NVM, enable a garbage collection process for the NVM, and maintain in the NVM at least said amount of dedicated unused memory; (ii) receiving a power-down notification message issued by the host and signaling an upcoming power-down event at the VM; and (iii) in response to receiving the power-down notification message, controlling the memory system to activate a shutdown mode of operation, whereby the memory system is configured to receive data from the VM, to store the received data, at least in parts, into the unused dedicated memory of the NVM, and to reduce or disable the operation of the garbage collection process for the NVM.

As used herein, the terms "memory controller" or "controller" are used in their broadest sense to refer to a controller device, which may be implemented as digital circuit that manages, at least in part, the operation of one or more memory devices and the flow of data going to and from such memory devices, such as VM or NVM devices. As a particular example, a memory controller may be implemented as a separate chip or chipset or be integrated into another chip or chipset, such as being placed on the same die or as an integral part of a microprocessor. In the latter case, it is usually called an integrated memory controller (IMC). A memory controller is sometimes also called a memory chip controller (MCC) or a memory controller unit (MCU).

As used herein, the term "safe shutdown" is used in its broadest sense to refer to a transition of a VM of a host, or of a host including such VM as a whole, from an active state in which the VM is continuously supplied with power from a power supply into an inactive state, such as a switched-off or hibernating state, in such a way that no unintended loss of data stored in VM occurs. As used herein, the term "power-down event" is used in its broadest sense to refer to an event, where the power supply of the host or at least of its VM is discontinued or becomes insufficient to fully support normal operation of the VM.

As used herein, the term "amount of dedicated unused memory" is used in its broadest sense to refer to a storage capacity of the NVM that is available for writing new data to it. As a particular example, the amount may be expressed in terms of a number of memory blocks or a measure based thereon. The actual physical location of the memory units representing this storage capacity and being available for receiving data previously stored in the VM does not have to be fixed at the time of the reservation of said predetermined amount of unused dedicated memory in the NVM, although some embodiments may include such an implementation. Rather, only the amount of dedicated unused storage capacity must be safeguarded in order to have it available in case of a shutdown. The actual set of memory units such as memory blocks or memory cells on the physical level or pages on the logical level may vary over time until the actual transfer of data from the VM into the corresponding dedicated unused memory of the NVM actually occurs. Without limitation, an "unused" memory may nevertheless still physically store previous (esp. now obsolete) data.

As used herein, the term "host" is used in its broadest sense to refer to a device being configured to access an associated memory including both VM and NVM. As a particular example, a computer system including one or more processors using the associated memory to store e.g., one or more computer programs and/or data is a host in the sense of the present inventions. The NVM may form an integral part of such a computer system but may also be external therefrom though accessible by the host. In some instances, the host may at the same time be and thus coincide with the controller performing the method of the present invention.

Accordingly, in order to ensure a certain minimum write performance regardless of memory device state and write command workload before the power-down event, a dedicated fraction of the NVM's writable storage capacity (e.g. flash blocks) is reserved during normal operation and used for writing only after the power-down event was detected by the host and notified to the memory controller (or a respective controller function of the host, if it coincides with the controller). Reducing the activity of the operation of the garbage collection process, which may even include fully disabling it, allows the host to use more or even all of the NVM bandwidth for writing and thus transferring the data in the VM that should be preserved into the NVM.

In the following, various embodiments of the method are described, which may be arbitrarily combined with each other or with other aspects of the present invention, unless such combination is explicitly excluded or technically impossible.

In some embodiments, reserving the predetermined amount of unused dedicated memory in the NVM and controlling the memory system to operate in the normal mode of operation includes reserving at least one specific unused dedicated memory portion in the NVM and controlling the memory system such that during the normal mode of operation the host's write access to the dedicated memory portion is disabled. As used herein, the term "unused memory portion" or "unused (memory) block(s)" is used in its broadest sense to refer to a memory portion or block(s), respectively, that is available for writing new data to it, e.g., by way of being marked accordingly in corresponding control data of the memory system of which the memory portion forms a part. Without limitation, an unused memory portion may nevertheless still physically store previous (esp. now obsolete) data. Reserving a specific unused dedicated memory portion instead of only ensuring that in total enough unused memory capacity is available for a transfer of the selected content from the VM to the NVM may particularly be useful in rather time-critical cases where very short transfer times are required or desirable, since the allocation of one or more specific memory portions of the NVM to receive the transferred content can occur prior to the actual transfer process which is thus not burdened with such allocation after the power-down notification message is received.

In some embodiments, controlling the memory system to activate the shutdown mode of operation includes reconfiguring at least one defined trigger level for activating the garbage collection process, such as to cause a triggering of the garbage collection process in the NVM only at the occurrence of a lower amount of remaining unused memory capacity than in normal operation of the NVM. In this way, a high efficiency of an implementation of the method can be achieved based on a reconfiguration of an already existing functionality of the NVM. Particularly, the trigger level can be reconfigured in such a way, e.g., by setting it to a value corresponding to zero remaining unused memory capacity, that the garbage collection process is, at least in practice, fully disabled.

In some embodiments, the methods further include: receiving a configuration command from the host prior to receiving the power-down notification message, wherein: (i) the configuration command specifies a measure for a required storage capacity of unused dedicated memory in the NVM; and (ii) reserving a predetermined amount of unused dedicated memory in the NVM includes reserving an amount of unused dedicated memory in the NVM that matches or exceeds the storage capacity specified in the configuration command. In this way, the host is enabled to selectively configure the amount of unused dedicated memory in the NVM according to current requirements. This allows for an enhanced degree of flexibility. For example, the configuration command may include an indicator selecting one of a plurality of predefined storage capacities or it may specifically define the size of the required storage capacity. Furthermore, the measure may be derived from an actual amount of data in the VM to be preserved or from the size of one or more memory segments of the VM, in which relevant data to be preserved is stored, and which may be defined—without limitation—within a corresponding physical or logical memory space associated with the VM.

In various embodiments, the configuration command includes one or more of a device-independent standardized command and a device-specific command. As used herein, the term "standardized command" is used in its broadest sense to refer to a command that is defined and specified as an official or de facto industry standard, such as for example by a standard specification issued by the JEDEC Solid State Technology Association (JEDEC), and is thus typically applicable to a broad range of different memory systems from different vendors. While using a standardized command allows for a greater compatibility of the memory controller with hosts of many different types and vendors, using a device-specific or similarly a vendor-specific command may be particularly advantageous in specific situations that require dedicated adaptations to particular use cases and applications beyond an available standard specification.

In some embodiments, the methods further include: (i) detecting a restoration of a power supply of the memory system after a power-down event affecting the memory system had occurred; and (ii) in response to the detection of the restoration of the power supply, triggering a garbage collection process with respect to the NVM to re-establish a predetermined amount of unused dedicated memory in the NVM, which may particularly be said previously determined same amount of unused dedicated memory in the NVM. In this way, the NVM may be brought back into a state, where it is again ready to properly react to another power-down event in that again sufficient dedicated unused memory space is reserved to receive data to be preserved from the VM before or during such further power-down event. It is noted, that this re-established amount of unused dedicated memory may but does not have to correspond to the same specific physical or logical memory portions, e.g. in terms of memory segments of the NVM, as that of a previous cycle. Furthermore, the amount of the re-established unused dedicated memory may particularly, without limitation, be the same as that before the power-down event occurred.

In some embodiments, the predetermined amount of unused dedicated memory in the NVM is defined in terms of a number of unused blocks of the NVM, wherein a memory block corresponds to a smallest segment within the NVM that can be selectively erased. Particularly in the case of flash-based NVM, the erasure of data stored in the NVM is typically performed only on block level. Defining the unused dedicated memory on block level allows for a particularly simple and efficient management and configuration of the corresponding actual memory portions of the NVM, as many control commands, including particularly erase commands, are typically already defined (also or even only) on block level. In some related embodiments, the actual physical set of blocks corresponding to the predetermined amount of unused dedicated memory varies over time, e, g, from cycle to cycle, which is particularly advantageous in view of achieving a desired wear leveling. In other words, in some embodiments the predetermined amount of unused dedicated memory only defines an extra amount of storage capacity that is reserved on top of the pool of unused memory block that are anyway present in normal operation of the NVM, rather than specifically pre-allocating specific physical memory blocks as a reserved physical memory portion.

In one or more embodiments, the power-down notification message includes one or more of a device-independent standardized command, a device-specific command and a bus signal. The advantages of using a standardized command or a device-specific command, respectively, have already been described above and apply here in a similar manner. Furthermore, using a bus signal to implement the power-down notification message allows for particularly simple and fast implementations, because no message formatting or other complexities frequently associated with command-related messaging need to be implemented.

In various embodiments, the method further includes: after receiving the power-down notification message, activating a supplemental power supply of the memory system, the supplemental power supply being independent from the power supply of the host and being dimensioned to supply sufficient power to the memory system to successfully receive and store in the NVM at least an amount of data matching said predetermined amount of unused dedicated memory. In this way, the reliability and safety of a shutdown of the memory system may be further enhanced. Particularly, the supplemental power supply helps to ensure that sufficient power is available to complete the transfer of the content to be preserved from the VM to the NVM, even if the previous (main) power supply is quickly discontinued or otherwise is no longer available to ensure a reliable supply of energy to the NVM and controller, e.g. in case of a hardware failure or instability.

In some embodiments, the memory system further includes a buffer memory having a higher write performance than the NVM, and controlling the memory system to activate a shutdown mode of operation includes configuring the memory system to buffer the data received from the VM in the buffer memory before transferring the buffered data from the buffer memory to the NVM. In this way, the transfer of the data to be preserved from the VM to the memory system can be accelerated, thus reducing the minimum remaining operational time of the VM that is required for a safe shutdown before the VM runs out of sufficient power supply. The memory system, which may include a power supply being independent of that of the VM, e.g. said supplementary power supply according to some embodiments described herein, may then complete the transfer of the data to be preserved into the NVM even when the VM has already run out of power.

Other embodiments provide memory controllers for controlling a memory system including the memory controller and non-volatile, particularly flash-based, memory, NVM, to perform a safe shutdown. The memory controller is configured to perform the method of the first aspect of the present invention, preferably according to one or more of the specific embodiments described herein. The memory controller may particularly be implemented in the form of an embedded controller functionality that is integrated in a device, such as an integrated circuit device, having substantial additional functionality (e.g. a memory device), or as discrete dedicated memory controller device.

Yet other embodiments provide memory systems that include: (i) the memory controller according to the second aspect, preferably according to one or more of the specific embodiments described herein; and (ii) non-volatile, particularly flash-based, memory, NVM. The memory system is configured to be controlled by the memory controller.

The description and embodiments of the method, as presented herein, similarly apply to the memory controller and the memory system according to the second and third aspects of the present invention, respectively.

In some embodiments, the memory system further includes a supplemental power supply being independent from the power supply of the VM. The supplemental power supply is configured to be activated, by the controller in response to receiving the power-down notification message, to supply power to the memory system while it operates according to the shutdown mode of operation.

Turning to FIG. 1, a memory system 1 is shown according to an embodiment of the present inventions which is connected via an address line A1, a data line D1, a control line C1 as well as a power supply line P1 to a host 8, which uses the memory system 1 and in particular has read and write access thereto. One or more, in particular all, of the aforementioned data, control and power supply lines may also be implemented in each case by means of a plurality of individual lines. The host 8, which may particularly be a computer system, has a volatile memory (VM) 4 comprising one or more volatile memory devices, for example a DRAM memory serving as a fast main memory of the host. In addition, the host has an energy storage 9, which may particularly comprise one or more capacitors, to support the host's operation when due to the occurrence of a power down event at the host 8 a transfer of all or part of the data stored in the VM 4 needs to be transferred and thus saved in the memory system 1. Accordingly, the energy capacity of the energy storage 9 of the host 8 is dimensioned such as to support such transfer until its completion.

The memory system 1 has a memory controller 2, which in turn has a processor unit 2a with one or more processors as well as an internal memory 2b. In the internal memory 2b, in particular, a computer program may be stored which contains instructions which cause the memory controller 2 to perform the method according to the invention. The memory controller 2 is connected via an address bus A, a data bus D and a control bus C to a non-volatile information memory 3 (NVM), e.g. a flash memory serving as a solid state disk (SSD) for long term data storage.

Furthermore, the memory system 1 comprises a supplemental power supply 5 which may be implemented in particular by means of an energy storage such as a buffer capacitor and/or a battery, and which serves for supplying the memory system 1 with power, when an external power supply provided by the host 8 via the power supply line P1 (or, where applicable, by another external power supply, not shown) is affected by a power-down event. The energy storage 5 is connectable via a switch 6, which may be implemented, in particular, as a power switch, to a supply bus P, which supplies both the memory controller 2, and the NVM 3 with power.

During normal operation of the memory system 1, the power required for its operation is supplied to it via the power supply line P1, while the energy storage 5 is decoupled from the supply bus P by the switch 6. However, if the external power supply via the supply line P1 (or otherwise) is impaired or no longer available due to a power-down event, the switch 6 being controlled by the memory controller 2 can be closed so as to couple the supplemental power supply 5 to the supply bus P for supplying power to the memory system 1 from the supplemental power supply 5 and thus independently or in addition to the external power supply. The supplemental power supply 5 is functionally independent from the (main) power supply of the host and is dimensioned to supply sufficient power to the memory system 1 to successfully perform and complete a transfer of all of the data to be preserved in case of a power-down event, i.e. of all or a predefined subset of the data stored in the VM (cf. FIG. 2), into the NVM. However, during normal operation, the main power supply through power supply line P1 may be used to re-charge the supplemental power supply, if the latter is rechargeable.

The address line A1 is for the host to access the NVM 3 by means of logical memory addresses via the memory controller 2, which converts them to physical memory addresses. The data line D1 is used accordingly to transfer the data required for write or read access from the host 8 to the memory system 1 or in the reverse direction. Via the control line C1, which is guided on the memory system 1 via an interface 7, the host 8 may send messages, such as control commands to the memory system 1, i.e. to the memory controller 2. In particular, a notification message may be provided, which allows the host 8 to signal to the memory system 1 that a power-down event, such as a shutdown, or an otherwise justified loss of the power supply via the power supply power P1 is imminent or immediately upcoming. The interface 7 may be particularly configured to receive standardized control commands. Preferably, the interface itself is, unlike in FIG. 1, even part of the memory controller 2. Accordingly, the notification message may be implemented using one or more controller commands, and particularly using standardized control command(s).

Figure 2:
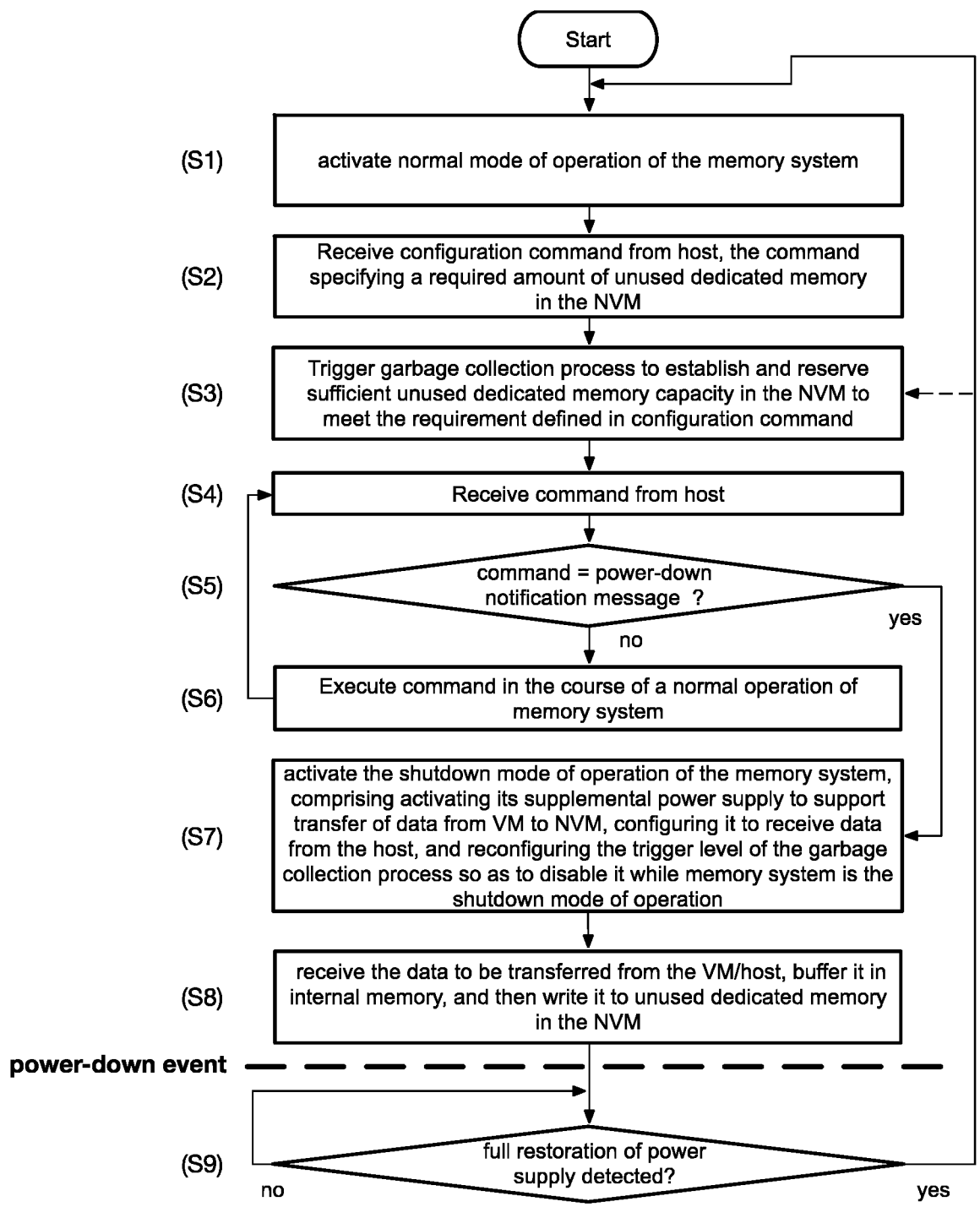
FIG. 2 shows a flow chart illustrating an embodiment of a method according to the present inventions.

In the following explanation of an embodiment, as illustrated in FIG. 2, reference is made to the exemplary arrangement shown in FIG. 1, which reference is however not to be understood as a limitation.

The method is performed by the memory controller 2 of the memory system 1 shown in FIG. 1. It comprises a preparation phase comprising steps S1 through S3. In step S1, the controller 2 configures the memory system 1 such as to activate its normal mode of operation, in which it provides read/write access to the host 8. In a further step S2, the controller 2 receives a configuration command from the host 8, wherein the command specifies a required amount of unused dedicated memory portion in the NVM 3. The desired storage capacity corresponds to storage space that is to be reserved in the NVM 3 for the purpose of receiving from the VM 4 data to be preserved in the case of a power-down event. However, at this point the storage space does not have to be specified in terms of a specific physical or logical memory space. It is sufficient to define the total amount of unused dedicated memory to be reserved. In step S3, a garbage collection process is triggered to establish and reserve sufficient unused dedicated memory capacity in the NVM 3 to meet the requirement defined in the configuration command, i.e. the required storage capacity to be reserved.

The method proceeds to an operational phase comprising steps S4 through S6. In step S4 the controller 2 receives a command from host 8. Subsequent step S5 comprises determining, whether the command received in step S4 is a power-down notification message. If not (S5—no), the controller 2 executes the command in a further step S6 in the course of normal operation of the memory system 1. For example, said command might be a read command for reading data stored in the NVM 3. Then, the method loops back to step S4 to wait for a further command from the host 8.

If, however, in step S5 a determination is made that the command received in step S4 is a power-down notification message (S5—yes), the method proceeds to a preservation phase comprising steps S7 through S9. In step S7 a predefined shutdown mode of operation of the memory system 1 is activated by the controller 2. The activation of the shutdown mode comprises (i) activating the supplemental power supply 5 of the memory system 1 by closing the switch 6 to support a transfer of data from the VM to the NVM by ensuring the necessary energy supply for related subsequent step S8. The activation of the shutdown mode further comprises configuring the memory system to receive data for the host 8, and to reconfigure the trigger level of the garbage collection process of the NVM such as to disable it, while the memory system 1 is in the shutdown mode of operation, such that the bandwidth of the NVM that is available for the transfer of data from the VM to the NVM is optimized. Then in step S8, the actual transfer of the data takes place, wherein the data is received at the memory system 1, i.e. at its controller 2, and initially buffered, in whole or in part, in the controller's internal memory 2b (e.g. fast DRAM) before writing it into the NVM, including in storage capacity corresponding to the reserved amount of unused dedicated memory thereof. At least during execution of step S8, any simultaneous garbage collection process is stopped or blocked by the controller 2 due to the reconfigured (per step S7) trigger level, in order to ensure that the full intrinsic memory bandwidth of the memory system 1 is available for the transfer. Once the transfer is completed, the memory system 1 has reached a state, where it is ready for the imminent power-down event, i.e. in a state, where all of data to be preserved has been successfully stored in the NVM 3, where it is safely stored in a non-volatile manner and thus not affected by the power-down event.

A further step S9 may follow, where, to the extent the memory system 1 is (again) sufficiently supplied with the power necessary to perform that step S9, a determination is made, as to whether or not the power supply for the memory system 1 has been fully restored again to allow normal operation. If not (S9—no), the method loops back to perform another step S9. Otherwise (S9—yes) the method iterates back either to the preparation phase starting at step S1, or alternatively, if configured so, immediately to step S3 (cf. dashed arrow), thus triggering another garbage collection process to re-establish sufficient unused dedicated memory capacity in the NVM 3 to again meet the storage requirement defined in the configuration command of the last occurrence of step S2. Accordingly, the unused dedicated memory portion in the NVM 3 that is reserved may relate to a different physical or logical memory portion of the NVM 3 than in the previous iteration of the method. This is at least the case, if the garbage collection process occurs before the preserved data transferred to the NVM 3 in step S8 has not been transferred back into the VM 4 or any other destination or has been abandoned.

In conclusion, the inventions provide novel systems, devices, methods and arrangements for providing safe shutdown of a memory system. While detailed descriptions of one or more embodiments of the inventions have been given above, various alternatives, modifications, and equivalents will be apparent to those skilled in the art without varying from the spirit of the inventions. Therefore, the above description should not be taken as limiting the scope of the inventions, which are defined by the appended claims.

LIST OF REFERENCE SIGNS

1 Memory system
2 (Memory) controller
2a processing unit
2b internal memory
3 nonvolatile memory, NVM
4 volatile memory, VM, of host
5 supplemental power supply, esp. energy storage, of memory system
6 switch, in particular circuit breaker, controlled by the memory controller 2
7 interface
8 host
9 energy storage of host
A address bus
C control bus
D data bus
P supply bus
A1 address line host—memory system
C1 control line host—memory system
D1 data line(s) host—memory system
P1 power supply line—memory system

What is claimed is:

1. A method of controlling a memory system including a memory controller and non-volatile memory (NVM) to enable a safe shutdown of a volatile memory (VM) of a host, the method comprising:
    reserving a predetermined amount of unused dedicated memory in the NVM and controlling the memory system to operate in a normal mode of operation in which it is configured to provide at least write access to the NVM, enable a garbage collection process for the NVM, and maintain in the NVM at least said amount of dedicated unused memory, and wherein reserving the predetermined amount of unused dedicated memory in the NVM and controlling the memory system to operate in the normal mode of operation includes reserving at least one specific unused dedicated memory portion in the NVM and controlling the memory system such that during the normal mode of operation the host's write access to the dedicated memory portion is disabled;
    receiving a power-down notification message issued by the host and signaling an upcoming power-down event at the VM; and
    in response to receiving the power-down notification message, controlling the memory system to activate a shutdown mode of operation, whereby the memory system is configured to receive data from the VM, to store the received data, at least in parts, into the unused dedicated memory of the NVM, and to reduce or disable the operation of the garbage collection process for the NVM.

2. The method of claim 1, wherein controlling the memory system to activate the shutdown mode of operation includes reconfiguring at least one defined trigger level for activating the garbage collection process, wherein the garbage collection process in the NVM is triggered only at the occurrence of a lower amount of remaining unused memory capacity than in normal operation of the NVM.

3. The method of claim 1, the method further comprising:
    receiving a configuration command from the host prior to receiving the power-down notification message, wherein the configuration command specifies a measure for a required storage capacity of unused dedicated memory in the NVM; and
    reserving a predetermined amount of unused dedicated memory in the NVM comprises reserving an amount of unused dedicated memory in the NVM that matches or exceeds the storage capacity specified in the configuration command.

4. The method of claim 3, wherein the configuration command comprises one or more of a device-independent standardized command and a device-specific command.

5. The method of claim 1, the method further comprising:
    detecting a restoration of a power supply of the memory system after a power-down event affecting the memory system had occurred; and
    in response to the detection of the restoration of the power supply, triggering a garbage collection process with respect to the NVM to re-establish a predetermined amount of unused dedicated memory in the NVM.

6. The method of claim 1, wherein the predetermined amount of unused dedicated memory in the NVM is defined in terms of a number of unused blocks of the NVM, and wherein a memory block corresponds to a smallest segment within the NVM that can be selectively erased.

7. The method of claim 1, wherein the power-down notification message includes one or more of a device-independent standardized command, a device-specific command and a bus signal.

8. The method of claim 1, the method further comprising:
    after receiving the power-down notification message, activating a supplemental power supply of the memory system, the supplemental power supply being independent from the power supply of the host and being dimensioned to supply sufficient power to the memory system to successfully receive and store in the NVM at least an amount of data matching said predetermined amount of unused dedicated memory.

9. The method of claim 1, wherein the memory system further includes a buffer memory having a higher write performance than the NVM, the method further comprising:
    controlling the memory system to activate a shutdown mode of operation comprises configuring the memory system to first buffer the received data in the buffer memory and to subsequently transfer the buffered data from the buffer memory to the NVM.

10. A memory system, the memory system comprising:
    a non-volatile (NVM); and
    a memory controller, wherein the memory controller is configured to
        reserve a predetermined amount of unused dedicated memory in the NVM and control the memory system to operate in a normal mode of operation in which it is configured to provide at least write access to the NVM, enable a garbage collection process for the NVM, and maintain in the NVM at least said amount of dedicated unused memory, and wherein reserving the predetermined amount of unused dedicated memory in the NVM and controlling the memory system to operate in the normal mode of operation includes reserving at least one specific unused dedicated memory portion in the NVM and controlling the memory system such that during the normal mode of operation the host's write access to the dedicated memory portion is disabled;
        receive a power-down notification message issued by the host and signaling an upcoming power-down event at a volatile memory (VM); and
        in response to receiving the power-down notification message, control the memory system to activate a shutdown mode of operation, whereby the memory system is configured to receive data from the VM, to store the received data, at least in parts, into the unused dedicated memory of the NVM, and to reduce or disable the operation of the garbage collection process for the NVM.

11. The system of claim 10, wherein controlling the memory system to activate the shutdown mode of operation includes reconfiguring at least one defined trigger level for activating the garbage collection process, wherein the garbage collection process in the NVM is triggered only at the occurrence of a lower amount of remaining unused memory capacity than in normal operation of the NVM.

12. The system of claim 10, wherein the memory controller is further configured to:
  receive a configuration command from the host prior to receiving the power-down notification message, wherein the configuration command specifies a measure for a required storage capacity of unused dedicated memory in the NVM; and
  reserve a predetermined amount of unused dedicated memory in the NVM comprises reserving an amount of unused dedicated memory in the NVM that matches or exceeds the storage capacity specified in the configuration command.

13. The system of claim 12, wherein the configuration command comprises one or more of a device-independent standardized command and a device-specific command.

14. The system of claim 10, wherein the memory controller is further configured to:
  detect a restoration of a power supply of the memory system after a power-down event affecting the memory system had occurred; and
  in response to the detection of the restoration of the power supply, trigger a garbage collection process with respect to the NVM to re-establish a predetermined amount of unused dedicated memory in the NVM.

15. The system of claim 10, wherein the predetermined amount of unused dedicated memory in the NVM is defined in terms of a number of unused blocks of the NVM, and wherein a memory block corresponds to a smallest segment within the NVM that can be selectively erased.

16. The system of claim 10, wherein the power-down notification message includes one or more of a device-independent standardized command, a device-specific command and a bus signal.

17. The system of claim 10, wherein the memory controller is further configured to:
  after receiving the power-down notification message, activate a supplemental power supply of the memory system, the supplemental power supply being independent from the power supply of the host and being dimensioned to supply sufficient power to the memory system to successfully receive and store in the NVM at least an amount of data matching said predetermined amount of unused dedicated memory.

18. The system of claim 10, wherein the memory system further comprises:
  a buffer memory having a higher write performance than the NVM; and
  wherein controlling the memory system to activate a shutdown mode of operation includes configuring the memory system to first buffer the received data in the buffer memory and to subsequently transfer the buffered data from the buffer memory to the NVM.

19. A memory controller, the memory controller configured to:
  reserve a predetermined amount of unused dedicated memory in a non-volatile memory (NVM) and control a memory system to operate in a normal mode of operation in which it is configured to provide at least write access to the NVM, enable a garbage collection process for the NVM, and maintain in the NVM at least said amount of dedicated unused memory, and wherein reserving the predetermined amount of unused dedicated memory in the NVM and controlling the memory system to operate in the normal mode of operation includes reserving at least one specific unused dedicated memory portion in the NVM and controlling the memory system such that during the normal mode of operation the host's write access to the dedicated memory portion is disabled;
  receive a power-down notification message issued by the host and signaling an upcoming power-down event at a volatile memory (VM); and
  in response to receiving the power-down notification message, control the memory system to activate a shutdown mode of operation, whereby the memory system is configured to receive data from the VM, to store the received data, at least in parts, into the unused dedicated memory of the NVM, and to reduce or disable the operation of the garbage collection process for the NVM.

20. The memory controller of claim 19, wherein controlling the memory system to activate the shutdown mode of operation includes reconfiguring at least one defined trigger level for activating the garbage collection process, wherein the garbage collection process in the NVM is triggered only at the occurrence of a lower amount of remaining unused memory capacity than in normal operation of the NVM.

21. The memory controller of claim 19, wherein the memory controller is further configured to:
  receive a configuration command from the host prior to receiving the power-down notification message, wherein the configuration command specifies a measure for a required storage capacity of unused dedicated memory in the NVM; and
  reserve a predetermined amount of unused dedicated memory in the NVM comprises reserving an amount of unused dedicated memory in the NVM that matches or exceeds the storage capacity specified in the configuration command.

22. The memory controller of claim 19, wherein the memory controller is further configured to:
  detect a restoration of a power supply of the memory system after a power-down event affecting the memory system had occurred; and
  in response to the detection of the restoration of the power supply, trigger a garbage collection process with respect to the NVM to re-establish a predetermined amount of unused dedicated memory in the NVM.

23. The memory controller of claim 19, wherein the predetermined amount of unused dedicated memory in the NVM is defined in terms of a number of unused blocks of the NVM, and wherein a memory block corresponds to a smallest segment within the NVM that can be selectively erased.

24. The memory controller of claim 19, wherein the power-down notification message includes one or more of a device-independent standardized command, a device-specific command and a bus signal.

25. The memory controller of claim 19, wherein the memory controller is further configured to:

after receiving the power-down notification message, activate a supplemental power supply of the memory system, the supplemental power supply being independent from the power supply of the host and being dimensioned to supply sufficient power to the memory system to successfully receive and store in the NVM at least an amount of data matching said predetermined amount of unused dedicated memory.

26. The memory controller of claim 19, wherein controlling the memory system to activate a shutdown mode of operation includes configuring the memory system to first buffer the received data in a buffer memory and to subsequently transfer the buffered data from the buffer memory to the NVM, wherein the buffer memory exhibits a higher write performance than the NVM.

* * * * *